United States Patent
Sonti et al.

[19]

[11] Patent Number: 6,108,540
[45] Date of Patent: Aug. 22, 2000

[54] MULTI-PROFILE SUBSCRIBER

[75] Inventors: Jagdish Venkata Sonti, Ottawa; William Edward Illidge, Kanata, both of Canada

[73] Assignee: Nortel Networks Corporation, Montreal, Canada

[21] Appl. No.: 08/997,783

[22] Filed: Dec. 24, 1997

[51] Int. Cl.[7] .................................................. H04Q 7/38
[52] U.S. Cl. ............................................. 455/433; 455/414
[58] Field of Search .................................. 455/433, 435, 455/432, 410, 411, 560, 414, 422, 461, 418

[56] References Cited

U.S. PATENT DOCUMENTS

| | | | |
|---|---|---|---|
| 5,142,654 | 8/1992 | Sonberg et al. | 455/433 |
| 5,428,665 | 6/1995 | Lantto | 455/433 |
| 5,537,457 | 7/1996 | Lantto et al. | 455/433 |
| 5,564,068 | 10/1996 | Nguyen | 455/433 |
| 5,577,103 | 11/1996 | Foti | 379/59 |
| 5,781,858 | 9/1995 | Lantto et al. | 455/433 |
| 5,850,603 | 10/1996 | Lantto et al. | 455/433 |
| 5,913,165 | 6/1999 | Foti | 455/435 |
| 5,915,220 | 5/1997 | Chelliah | 455/435 |

FOREIGN PATENT DOCUMENTS

WO9720441 5/1997 WIPO .............................. H04Q 7/22

OTHER PUBLICATIONS

Eleftheriadis et al, XP 000606584, User profile identification in future mobile telecommunications systems, IEEE Network, 1994, pp. 33–39, Oct. 1994.
Zaid, XP 000478092, Personal Mobility in PCS, IEEE Personal Communications, 1994, pp. 12–16, Oct. 1994.
Sundborg, XP 000406698, Universal personal telecommunication concept and standardisation, Ericsson review, 1993, pp. 140–155, Apr. 1993.

*Primary Examiner*—Nguyen Vo
*Assistant Examiner*—Duc Nguyen

[57] ABSTRACT

A method for allowing subscribers of a telecommunications network to change easily between sets of desired features is disclosed. The home location register stores multiple profiles of all subscribers within its serving region along with an active profile number field indicating the list of features currently available to each subscriber. Upon initial registration of the mobile station at a mobile switching center communicating with the home location register, a default profile is extracted from the home location register. Upon dialling a special code or number, a subscriber can prompt a change of profile containing a different set of features for different users of the mobile station or for different times of day or geographic areas. In this way, subscribers bypass the routine of having to contact an agent in order to add or remove features and are allowed to switch among multiple profiles at will. A personal identification number can be used to enhance the security of the profile change procedure.

17 Claims, 8 Drawing Sheets

MULTI-PROFILE SUBSCRIBER

FIELD OF THE INVENTION

This invention generally relates to cellular telecommunications systems and, more particularly, to a method and apparatus for allowing subscribers of a cellular telecommunication network to change easily between sets of activated features.

BACKGROUND OF THE INVENTION

Modern cellular telecommunications networks are divided into cells which service mobile stations (mobile phones) in a defined area. The cells each contain a base station which exchanges voice and control information over respective voice and control channels with mobile stations located within the cell's coverage area. The control channel performs the function of providing access for mobile subscribers to services provided by cells within a cellular telecommunications network, and can be either analog or digital.

In a typical cellular network, multiple base stations communicate with a mobile switching center, and multiple mobile switching centers in turn communicate with each other and with a home location register. A widely used protocol for communication among components of the network is the Telecommunications Industries Association IS-41 specification, hereby incorporated by reference herein.

Today's telecommunications service providers offer subscribers a great deal of flexibility in managing their telephone calls, offering them such features as call waiting or long-distance call blocking. Additionally, a subscriber may be permitted to forward a call to another number or have access to voice mail services. Each subscriber is permitted to draw up at least one list of desired features which, when appended to other information about the subscriber such as passwords or identification numbers, constitutes the subscriber's profile.

Mobile stations employed to place or receive telephone calls usually have only one associated subscriber, but possibly several users, including the subscriber in question. In a scenario such as a household, a mobile station may often change hands among these different users, each one not necessarily having the same needs or level of authorization as the others. For example, if an adult subscriber whose profile does not include the long-distance call blocking feature lends the phone to a child user, the adult subscriber may decide to invoke this and perhaps other features while possibly desiring to remove certain features from his or her current profile. Presently, in order to achieve this, the adult subscriber must call his or her service provider and request an agent to access his or her profile in order to effect the required changes. This procedure is cumbersome, and presents an inconvenience to both subscriber and service provider.

Moreover, a particular subscriber might be the sole user of a mobile station, but may desire different features to be active in different geographical areas or during different times of day. In this and many other realistic situations, adding or removing numerous features, especially on a frequent basis, is a tedious and inconvenient process.

As competition and advancing technology drive to increase the number of available features, considerable effort will be required on the part of subscribers wishing to alternate among various lists of desired features. Although there are no known prior art teachings of a solution to the aforementioned deficiencies and shortcomings such as that disclosed herein, a number of prior art references exist that discuss related subject matter, such as U.S. Pat. No. 5,577,103 (Foti), and Published International PCT Application No. W.O. 97/20441 (Tom). Each of these references is discussed briefly below.

U.S. Pat. No. 5,577,103 (Foti) discloses a method of providing a subscriber in a cellular telephone network with information from a subscriber device profile. A mobile station sends a request for the service profile to a home location register. Once the profile information is received, it is displayed on the visual display of the mobile station. However, the subscriber is not given the opportunity to possess multiple profiles at the home location register.

Published International PCT Application No. W.O. 97/20441 (Tom) discloses a method for prioritizing greetings to a subscriber depending on which one of a plurality of service zones encompasses the subscriber. There are several subscriber zone profiles defined and stored in a home location register, and a prioritization method is provided for the case when service zones overlap geographically. Although multiple profiles are available, the subscriber cannot change profiles without actual physical displacement.

It would thus be a distinct advantage to have a method in which a subscriber is able to rapidly change the set of currently active features to another, not necessarily disjoint, set of features. That is to say, a subscriber should be able to easily switch between multiple profiles.

SUMMARY OF THE INVENTION

It is an object of the present invention to mitigate or obviate one or more disadvantages of the prior art.

Therefore, the present invention may be summarized according to a first broad aspect as a home location register for a telecommunications network, comprising a bank of information on each of a plurality of subscribers, the bank of information on a respective subscriber comprising an active profile number field and a plurality of feature lists identified by a number, wherein the active profile number field specifies which feature list is currently available to the respective subscriber.

The present invention may be summarized according to a second broad aspect as a telecommunications network serving a plurality of subscribers, comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the at least one mobile switching center.

The present invention may be summarized according to a third broad aspect as a method for activating features for a subscriber of a telecommunications network, the network serving a plurality of subscribers and comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the mobile switching center, the method comprising a mobile station transmitting a first message to a base station requesting registration of the mobile station; the base station communicating receipt of the first message to a mobile switching center; the mobile switching center transmitting a second message to the home location register notifying the home location register that the mobile station is required to register at the mobile switching center; and the home location register transmitting, in response to receiving the second message, a third message including the feature list specified in the active profile number field to the mobile switching center.

The present invention may be summarized according to a fourth broad aspect as a method for activating features for a subscriber of a telecommunications network, the network serving a plurality of subscribers and comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the mobile switching center, the method comprising a mobile station transmitting to a base station a sequence of dialled digits representing placement of a call; the base station communicating receipt of the dialled digits to a mobile switching center; the mobile switching center transmitting a first message to the home location register notifying the home location register that the mobile station has not registered at the mobile switching center; the home location register transmitting, in response to receiving the first message, a second message including the feature list specified in the active profile number field to the mobile switching center; the mobile switching center, in response to receiving the second message, instructing the mobile station to tune to a voice channel; and upon the mobile station tuning to the voice channel, the mobile switching center transmitting to the home location register a third message notifying the home location register that the mobile station is required to register at the mobile switching center.

The present invention may be summarized according to a fifth broad aspect as a method for allowing a subscriber of a telecommunications network to select a different profile of available features, the network serving a plurality of subscribers and comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the mobile switching center, the method comprising a mobile station transmitting a first message to a base station indicating a change of profile request; the base station communicating receipt of the first message to a mobile switching center; the mobile switching center transmitting the change of profile request in the form of a second message to the home location register; and the home location register transmitting a third message including the feature list specified in the active profile number field to the mobile switching center.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
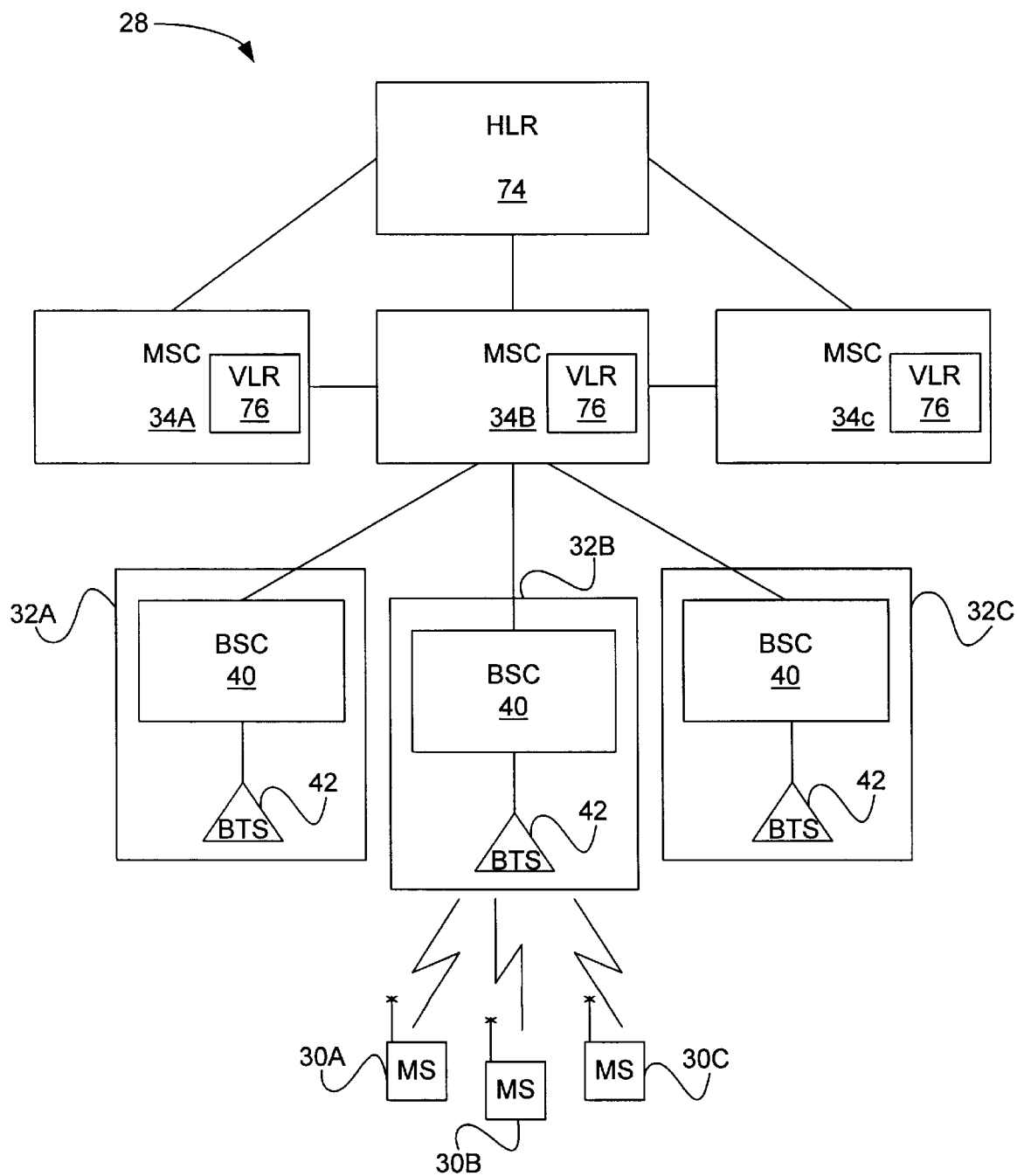
FIG. 1 is a block diagram of part of a prior art cellular telecommunications network.

FIG. 1 is a block diagram of part of a cellular telecommunications network 28, comprising a plurality of mobile stations 30 communicating through base stations 32 with mobile switching centers 34. By way of example, three mobile stations 30A,B,C are shown communicating with a base station 32B, three base stations 32A,32B,32C are shown communicating with a mobile switching center 34B and three mobile switching centers 34A,B,C are shown communicating with a home location register (HLR) 74. The mobile switching centers either comprise, or are otherwise connected to, respective visitor location registers (VLRs) 76. The base stations each comprise a base station controller 40 for execution of signal processing functions and interfacing with the remainder of the network, and a base transceiver system 42 for wireless communication with mobile stations.

Typically, a base station is located within a cell covering an area such as a city block or an apartment building, and a mobile switching center serves a larger geographical area, such as a city suburb. The mobile switching centers are connected to the public switched telephone network (PSTN) or another known communications network, and function to process and switch through their associated base stations any cellular calls originated or received by subscribers using mobile stations. The visitor location register of a mobile switching center stores pertinent information on each subscriber whose mobile station is currently registered in the geographical area served by the mobile switching center. A software program running on microprocessors at a mobile switching center permits it to access and manage its visitor location register.

The home location register, for its part, comprises a bank of information on each subscriber within a large region such as an entire city, regardless of whether or not the mobile stations belonging to these subscribers are currently registered at a mobile switching center in this region. This profile information is a superset of the information stored at the visitor location register. The home location register will also comprise microprocessors running software in order to manage the subscriber database and communicate with the mobile switching centers.

Figure 2:
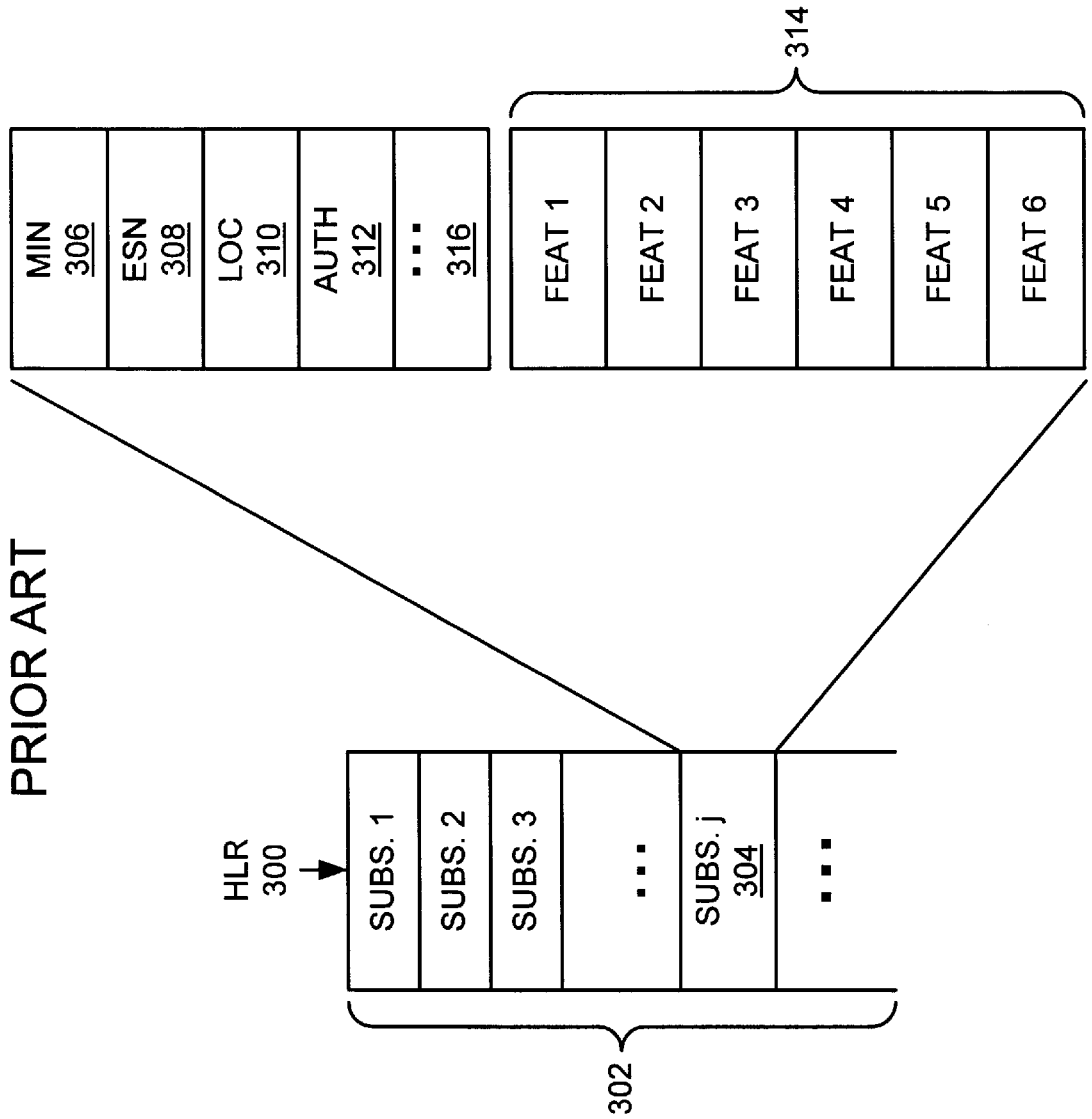
FIG. 2 is a representation of data contained in the prior art home location register of FIG. 1.

Reference is now made to FIG. 2, in which a prior art HLR 300 contains information about a large number of subscribers 302. Information about a specific (say j$^{th}$) subscriber 304, including a Mobile Identification Number (MIN) field 306, Electronic Serial Number (ESN) field 308, Last Registered Cell (LOC) field 310, Authentication Capability (AUTH) field 312, together with a list of a certain number (say 6) of subscriber-selected features 314, make up a subscriber's profile 320. There may be other data fields 316 in the profile 320, as well as a longer or shorter list of features 314. Also, the subscriber is not obliged to fill the feature list 314 with features, and may choose, for example, not to use any features at all, in which case the list of features 314 would contain null entries.

Figure 3:
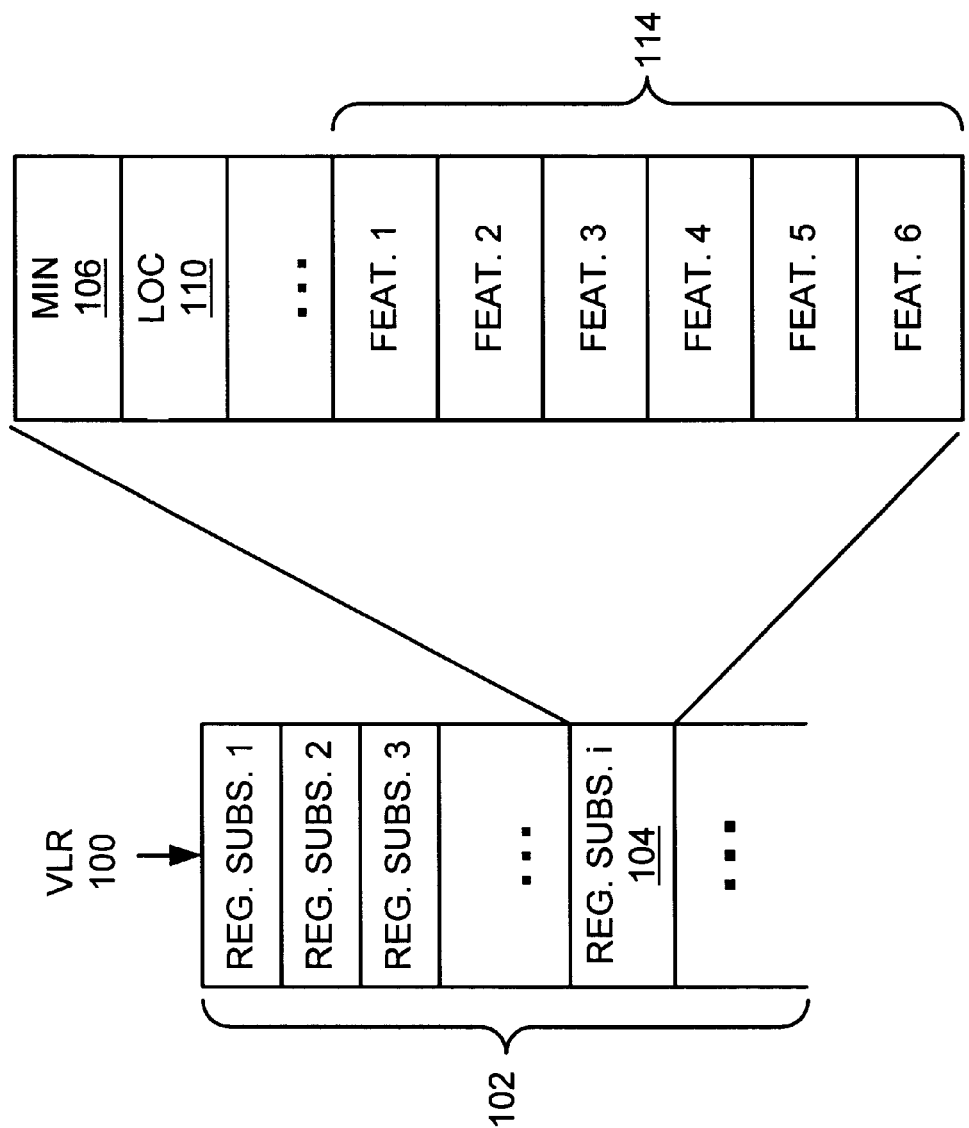
FIG. 3 is a representation of data contained in a prior art visitor location register of FIG. 1.

If a subscriber, whose profile is stored in a given HLR, activates his or her mobile station in the region served by this HLR, then the mobile switching center handling traffic with the base station generally closest to the mobile station will update its visitor location register with some, but not necessarily all profile information about this subscriber. Reference is now made to FIG. 3, which shows information typically stored at a VLR 100 for a given (say i$^{th}$) active, or registered, subscriber 104 among all currently registered subscribers 102 in the region served by the mobile switching center associated with the VLR 100. Such information may include, among other data, a Mobile Identification Number (MIN) field 106, a Last Registered Cell (LOC) field 110 and a list of features 114, these fields being consistent with those in the home location register. However, it is noted that for a registered subscriber the VLR contains fewer data fields than the HLR, and usually only those that are essential to maintaining a telephone call placed or received by the subscriber's mobile station.

In a typical cellular telecommunications network, subscriber data at the HLR remain fixed except for certain fields such as the LOC field, which is updated each time the subscriber's mobile station registers in a new cell, and the feature list, which the subscriber may wish to modify at random. As discussed previously, a subscriber can add or remove features by contacting a service provider representative, bringing about the known inconveniences for both subscriber and service provider. In order to alleviate such difficulties, the present invention allows each subscriber to possess multiple profiles stored in the HLR, each profile comprising common data fields as well as a feature list that may vary from profile to profile.

Figure 4A:
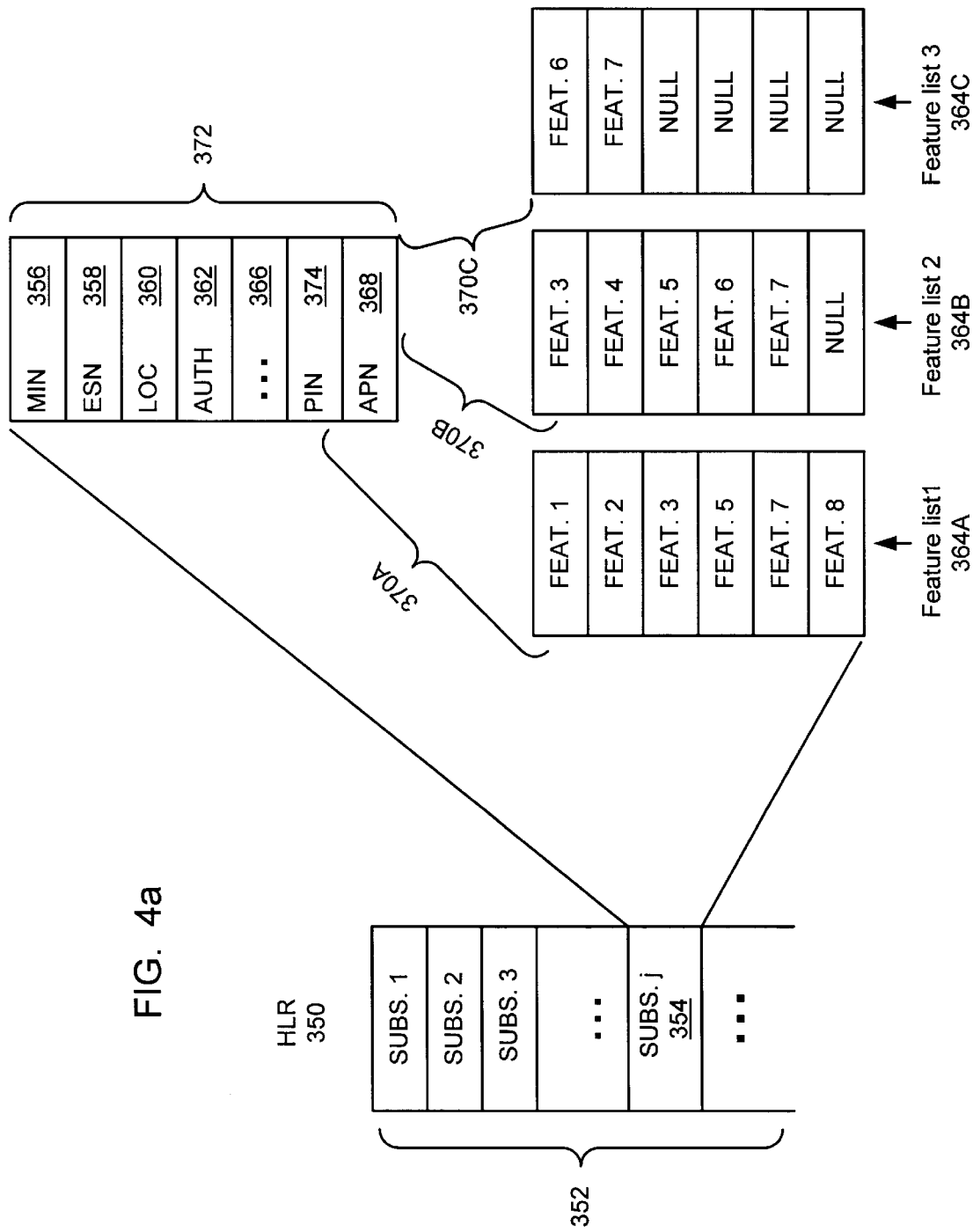
FIG. 4A is a representation of data contained in a home location register in accordance with the preferred embodiment of the present invention.

A better understanding of the invention can be gained by referring now to the preferred embodiment shown in FIG. 4A, which depicts an HLR containing a bank of information on each of a large number of subscribers 352. The information pertaining to a specific (again, say, the j$^{th}$) subscriber 354 will still include a MIN field 356, an ESN field 358, a LOC field 360 and an AUTH field 362. In addition, an Active Profile Number (APN) field 368, a Personal Identification Number (PIN) field 374, as well as a finite number of subscriber-selected feature lists 364A,B,C are also stored at the HLR.

The MIN 356, ESN 358, LOC 360, AUTH 362, APN 368, PIN 374 and possibly other fields 366 together represent so-called common profile information 372, which forms a complete profile when grouped with a particular feature list 364A,B,C. The APN field 368 is modifiable by the subscriber and denotes which feature list 364A,B,C is currently in use. The Active Profile Number field is preferably a number and will always be defined, even if this means resorting to a "default" active profile number before the subscriber has had an opportunity to make a selection. In light of the above, each combination of common profile information 372 and one feature list 364A,B,C creates a different profile 370A,B,C. The Personal Identification Number field 374 serves to protect the subscriber from unauthorized profile changes, and is preferably a user-selected series of digits.

Figure 4B:
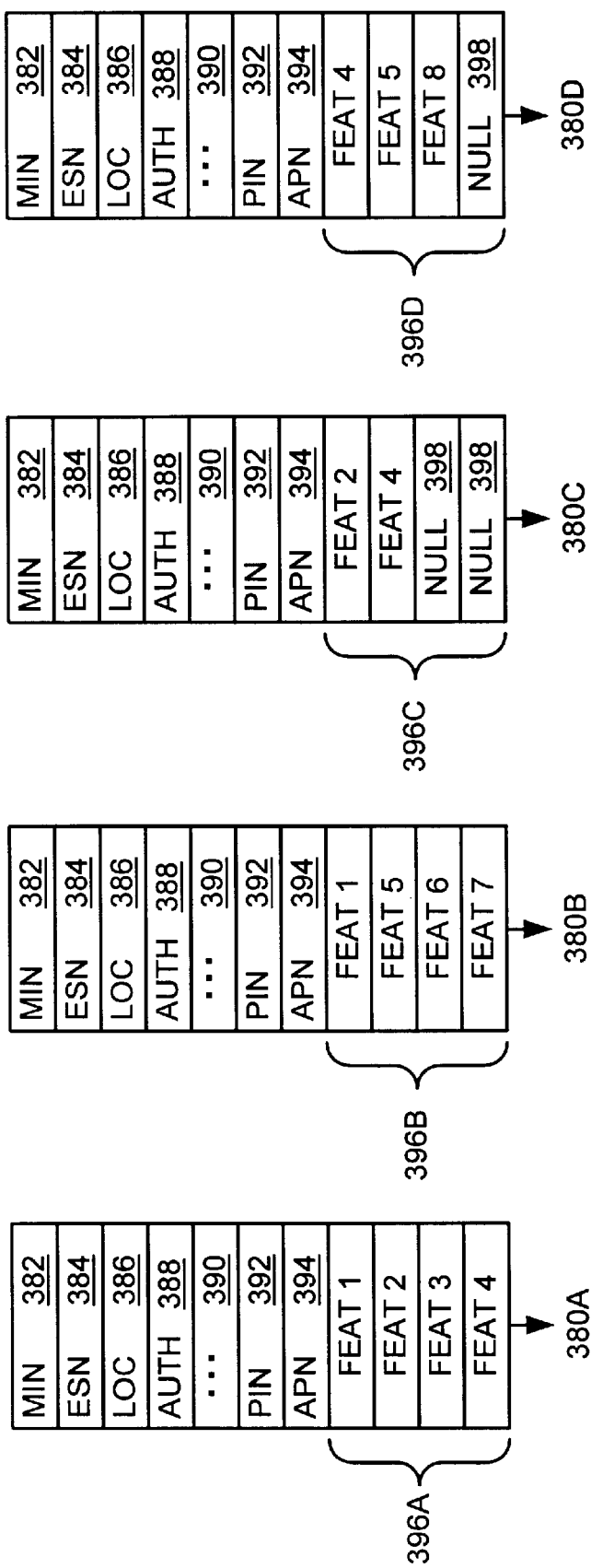
FIG. 4B is a representation of data contained in home location register in accordance with an alternate embodiment of the present invention.

Although modifications to each feature list 364A,B,C are still effected in the usual manner (by contacting the service provider), a subscriber can now switch easily between definable feature lists. It is within the scope of the present invention to provide a different number of feature lists than that which has been shown in the drawing, as well as a differing total number of permitted features on each list. Without departing from the spirit of the present invention, FIG. 4B shows an alternative data structure for storing subscriber information at an HLR, consisting of four profiles 380A,B,C,D per subscriber. Each profile contains a MIN 382, ESN 384, LOC 386, AUTH 388, PIN 392 and APN 394 field, as well as possibly other fields 390. Information in one of these fields is identical across all profiles 380A,B,C,D. In addition, each profile 380A,B,C,D comprises a finite-length feature list 396A,B,C,D which may differ from profile to profile. Null entries 398 complete a feature list when fewer than the maximum number (four, in FIG. 4B) of features are selected.

It is to be understood that the APN field 368 and PIN field 374 are not limited to being numbers. For example, they may consist of arrangements of letters which can be dialled from a mobile station using a code. A given letter may be encoded by dialling a first digit and a second digit respectively identifying the digit and position that the letter occupies on a standard telephone keypad.

The conventional HLR data structure must be modified in order to accommodate an active profile number field along with multiple feature lists. Furthermore, software modifications are required to the HLR in order to allow subscribers to change profiles, or when assigning a default active profile number upon registration of a mobile station. The VLR, on the other hand, need not know anything about a particular profile selected by the subscriber, since it concerns itself only with the features currently used by the subscribers that its MSC is serving. It is therefore significant to notice that no modifications are required to the VLR data structure. Current MSC software, on the other hand, needs to be reprogrammed to enable forwarding a message containing a user-requested profile to the HLR.

Figure 5:
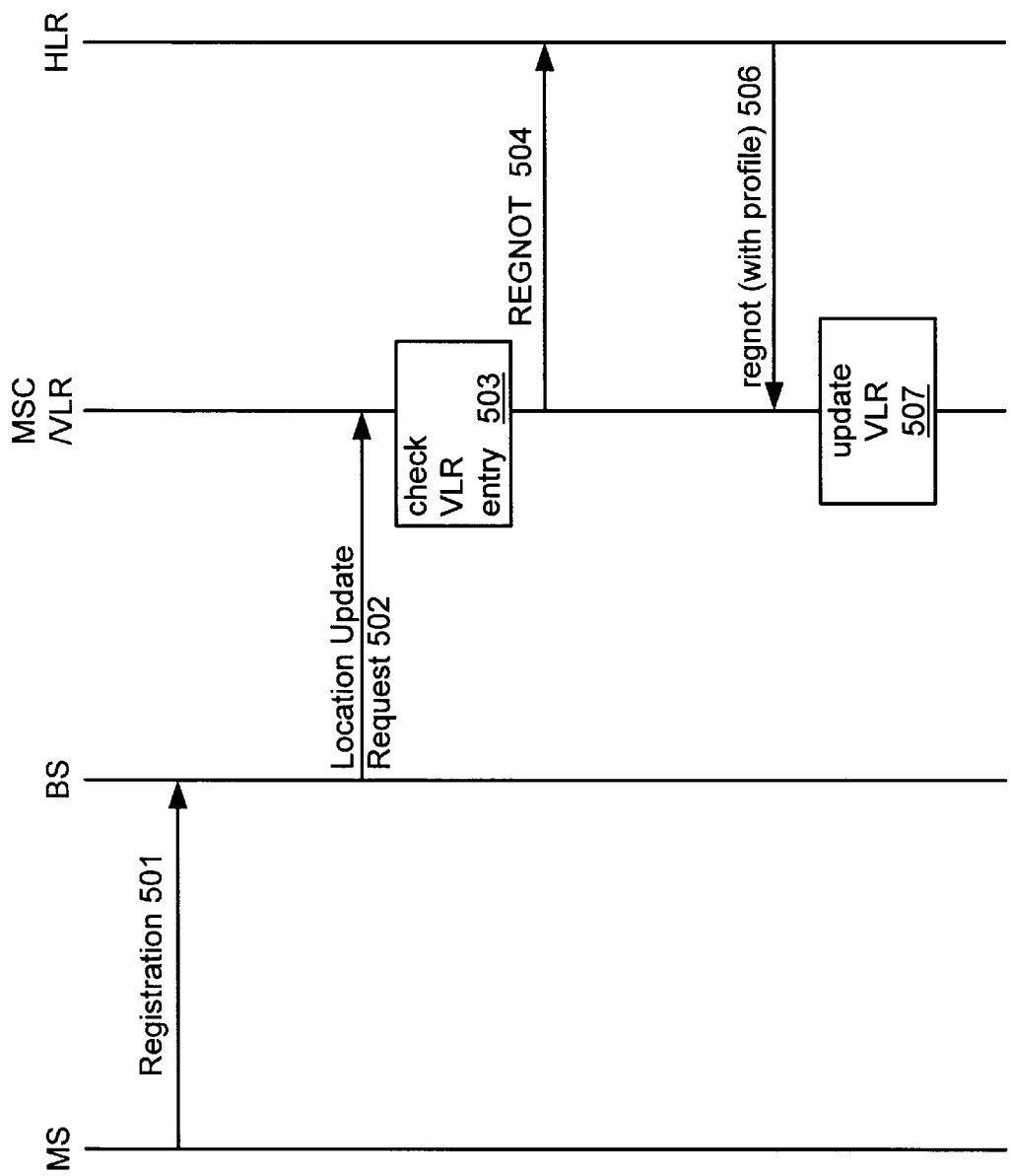
FIG. 5 is a message flow diagram illustrating the steps taken when initially registering a mobile station, prior to origination.

In order to fully understand the present invention, and in particular how an initial (default) profile is assigned upon registration, it is helpful to now refer to the flow diagram of FIG. 5. The case to be described refers to the first time that a given mobile station autonomously registers at a particular MSC prior to origination, which may occur when a mobile is turned on for the first time in the region served by the MSC in question or upon migration of the mobile station to the region served by the MSC. Standard procedure in this case of first-time autonomous registration is for the mobile switching center to retrieve information from the home location register and update the visitor location register at the mobile switching center. The network entities are assumed to abide by the IS-41 protocol and the illustrated messages use standard nomenclature, in which forward messages are identified in capital letters (e.g., "REGNOT") and return messages are indicated in lowercase letters (e.g., "regnot").

501) The mobile station begins by sending a "Registration" message to the base station.

502) The base station notifies its mobile switching center hat the mobile station has been detected in its region by ending a "Location Update Request" message.

503) The mobile switching center checks whether there is a VLR entry for this mobile station. If so, registration is not required and the exercise ends with the VLR updating the LOC field. Otherwise, the VLR creates an entry for the newly registering mobile station and fills the LOC field.

504) Knowing that its VLR has no other information about the subscriber, the mobile switching center sends a "REGNOT" (Registration Notification) message to the home location register, requesting profile and validation information corresponding to the mobile station wishing to register.

505) The home location register validates the mobile station, checks the active profile number field to see which list of features is to be selected by default, and updates the LOC field with information obtained from the MSC.

506) The home location register sends back a "regnot" (Registration Notification Return Result) message to the mobile switching center, along with relevant profile data, including the feature list corresponding to the active profile number identified in the APN field.

507) The mobile switching center subsequently updates its visitor location register with the (partial) profile information, thereby permitting the subscriber to use the associated features, and ending the registration procedure.

Situations may also arise whereby a call is riginated by a mobile station before it has had the occasion to register at the appropriate mobile switching center. This commonly occurs with hand held mobile stations that are kept powered down most of the time and then powered up for originations, possibly in a new mobile service region. The procedure is slightly different from that corresponding to autonomous registration, and is now described with reference to FIG. 6.

601) The mobile station originates a call.

602) The base station relays the origination to its mobile switching center.

603) The mobile switching center checks whether there is a VLR entry for this mobile station. If so, registration is not required and the exercise ends with the VLR updating the LOC field. Otherwise, the VLR creates an entry for the newly registering mobile station and fills the LOC field.

604) Knowing that its VLR has no other information about the subscriber, the mobile switching center sends a "QUALREQ" (Qualification Request) message to the home location register, requesting profile and validation information corresponding to the mobile station wishing to register.

605) The home location register validates the mobile station, checks the active profile number field to see which list of features is to be selected by default, and updates the LOC field with information obtained from the MSC.

606) The home location register sends back a "qualreq" (Qualification Request Return Result) message to the mobile switching center, along with relevant profile data, including the feature list corresponding to the active profile number identified in the APN field.

607) The mobile switching center subsequently updates its visitor location register with the (partial) profile information, thereby permitting the subscriber to use the associated features. However, registration will not occur until it is verified that the mobile station emitting the origination is indeed in the region served by the mobile switching center.

608) To this end, the mobile switching center orders the mobile station to tune to a voice channel (VCH). If the mobile station successfully tunes to a VCH, it is assumed to be within the serving region of the mobile switching center.

609) After the mobile switching center determines that the mobile station is within its serving region, it will send a "REGNOT" (Registration Notification) message to the home location register, possibly again requesting profile and validation information corresponding to the mobile station wishing to register.

610) The home location register validates the mobile station, checks the active profile number field to see which list of features is to be selected by default, and updates the LOC field with information obtained from the MSC.

611) It sends back a "regnot" (Registration Notification Return Result) message to the mobile switching center, and if it were requested to do so, along with relevant profile data, including the feature list corresponding to the active profile number identified in the APN field.

612) The mobile switching center subsequently updates its visitor location register with the (partial) profile information, thereby permitting the subscriber to use the associated features, and ending the registration procedure.

Figure 6:
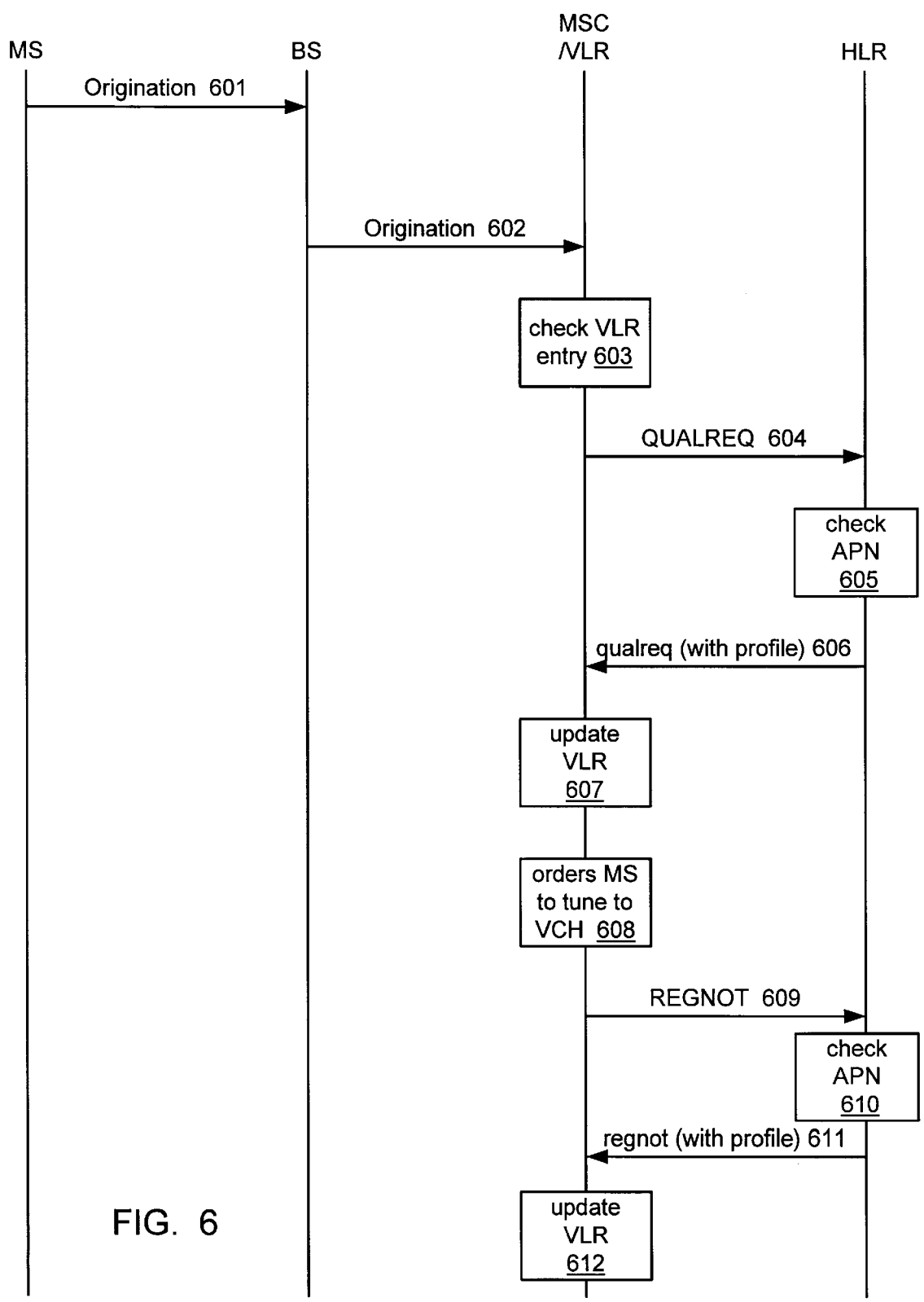
FIG. 6 is a message flow diagram illustrating the steps taken when a mobile station originates prior to initial registration.

In both FIGS. 5 and 6, if the mobile station were previously registered at another VLR, the home location register would send a "Registration Cancel" message to this previously serving VLR, which would in turn remove the mobile station from its database and send back a "Registration Cancel Return Result" to the home location register.

If a subscriber whose mobile station has already been registered at a mobile switching center wishes to select a new profile, a simple procedure would be to dial a profile service number (PSN) followed by a personal identification number (PIN) and a new profile number. In an adult/child scenario, the PIN could be used by the adult to change the profile at will, without giving the child an opportunity to do the same. Suitable candidates for the PSN include so-called "star" numbers such as "*611" or "1*432".

Figure 7:
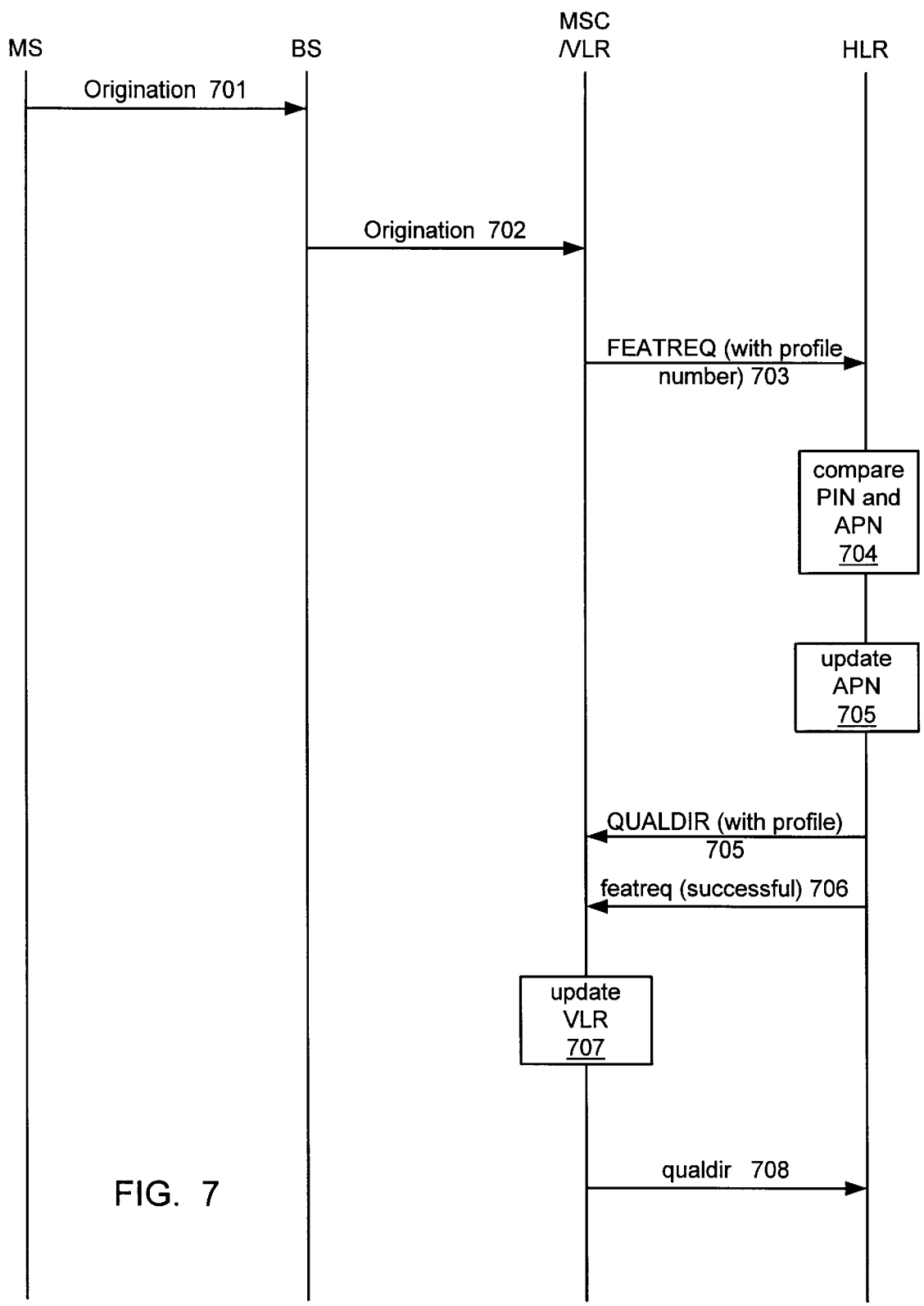
FIG. 7 is a message flow diagram illustrating the steps taken when changing a subscriber's active profile.

FIG. 7 shows in detail a profile change procedure in accordance with the present invention.

701) At the start, a sequence of digits comprising the PSN, PIN and a new active profile number identifying the desired feature list is originated.

702) The base station passes the dialled digits through to the mobile switching center.

703) The mobile switching center recognizes the PSN as a request for a feature from the mobile station (via the base station) and sends the remaining digits (the PIN and the new active profile number) to the HLR in the form of a "FEATREQ" message.

704) The HLR then proceeds with comparing the dialled PIN to the one in the subscriber profile and also compares the requested profile with the APN in the database. The HLR then checks to see whether the feature list requested by the subscriber is different from the one that the subscriber is currently using.

If either the PIN is invalid or the newly requested active profile number is the same as the one currently in use:

The HLR sends a "featreq" return message to the MSC, indicating that the profile change was unsuccessful.

If the subscriber has indeed requested a genuine profile change by dialling the PSN alone with a valid PIN and a feature list code different from the one currently in use:

705) The HLR updates the APN field with the new active profile number and sends the appropriate profile data (including the newly requested feature list) to the MSC in the form of a "QUALDIR" message.

706) The HLR also sends a "featreq" return message to the mobile switching center indicating that the profile change operation was successful.

707) Upon receipt of the "QUALDIR" message, the MSC updates its visitor location register, thereby permitting the subscriber to use the features in the newly requested feature list.

708) Upon updating the VLR, the MSC sends a "qualdir" (Qualification Request Return Result) message to the HLR, thereby terminating the profile change procedure.

It is to be noted that all but one of the messages transmitted between the various network elements are already in IS-41 standard format. It is only in the case of a FEATREQ message containing an active profile number, and transmitted during a change of profile request, that modifications need to be effected to the IS-41 protocol.

Moreover, systems operating outside the realm of IS-41 also stand to benefit from the present invention by following similar steps to the ones just described. The procedure to be followed would contain essentially the same ingredients as the above, with appropriate message names and formats replacing those used in IS-41.

It is also within the scope of the present invention to provide different dialled sequences for initiating a profile change procedure. Suitable alternatives range from dialling a numeric code preceded by either the star ("*") or pound ("#") key to dialling a toll-free number that accesses the HLR database. Furthermore, the ordering of PIN and new active profile number within the sequence of dialled digits may be interchanged without departing from the spirit of the invention.

While the preferred embodiment of the invention has been described and illustrated it will be apparent to one skilled in the art that variations in the design may be made. The scope of the invention, therefore, is only to be limited by the claims appended hereto.

We claim:

1. A telecommunications network for serving a plurality of subscribers, comprising:

a home location register having a bank of information on each of the plurality of subscribers, the bank of information on a respective subscriber having an active profile number field and a plurality of feature lists identified by a number, wherein the active profile number field specifies which feature list is currently available to the respective subscriber;

at least one mobile switching center communicating with the home location register;

at least one base station communicating with the at least one mobile switching center;

means at the base station for communicating receipt of a "Change of Profile Request" message from a mobile station to a mobile switching center, said "Change of Profile Request" message specifying the number of a new feature list;

means at the mobile switching center for transmitting the "Change of Profile Request" message to the home location register; and means at the home location register updating, in response to receipt of the "Change of Profile Request" message, the contents of the active profile number field with the number of the new feature list and transmitting a "New Profile Acknowledge" message including the new feature list specified in the active profile number field to the mobile switching center.

2. A telecommunications network according to claim 1, wherein every mobile switching center is associated with a respective visitor location register having a bank of entries corresponding respectively to subscribers registered at the respective mobile switching center, and every mobile switching center comprises means for updating its visitor location register with the feature list specified in the active profile number field on receipt of the "New Profile Acknowledge" message.

3. A method for activating features for a subscriber of a telecommunications network, the network serving a plurality of subscribers and comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the mobile switching center, the method comprising:

a mobile station transmitting to a base station a sequence of dialled digits representing placement of a call;

the base station communicating receipt of the dialled digits to a mobile switching center;

the mobile switching center transmitting a first message to the home location register notifying the home location register that the mobile station has not registered at the mobile switching center;

the home location register transmitting, in response to receiving the first message, a second message including the feature list specified in the active profile number field to the mobile switching center;

the mobile switching center, in response to receiving the second message, instructing the mobile station to tune to a voice channel; and upon the mobile station tuning to the voice channel, the mobile switching center transmitting to the home location register a third message notifying the home location register that the mobile station is required to register at the mobile switching center.

4. A method according to claim 3, the method further comprising the home location register transmitting, in response to receiving the third message, a fourth message including the feature list specified in the active profile number field to the mobile switching center.

5. A method according to claim 4, wherein the second, third and fourth messages are respectively "QUALREQ", "qualreq" and "regnot" messages in accordance with the IS-41 protocol.

6. A method according to claim 3, wherein every mobile switching center is associated with a respective visitor location register having a bank of entries corresponding respectively to subscribers registered at the respective mobile switching center, the method further comprising:

the mobile switching center, on receiving communication of the dialled digits, checking whether its visitor location register has an entry corresponding to the mobile station transmitting the dialled digits;

the mobile switching center transmitting the first message to the home location register only if its visitor location register has no entry corresponding to the mobile station; and the mobile switching center updating the visitor location register on receipt of the second message.

7. A method according to claim 6, wherein the entry corresponding to a subscriber registered at a mobile switching center comprises a last registered cell field, the method further comprising:

before transmitting the first message, and upon determining that its visitor location register contains no entry corresponding to the mobile station, the mobile switching center creating such an entry and filling the last registered cell field; and the home location register transmitting the second message after validating the mobile station.

8. A method according to claim 3, where in the first, second and third messages are respectively "QUALREQ", "qualreq" and "REGNOT" messages in accordance with the IS-41 protocol.

9. A method for allowing a subscriber of a telecommunications network to select a different profile of available features, the network serving a plurality of subscribers and comprising a home location register having a bank of information on each of the plurality of subscribers, the bank of information on a respective subscriber having an active profile number field and a plurality of feature lists identified by a number, wherein the active profile number field specifies which feature list is currently available to the respective subscriber; at least one mobile switching center communicating with the home location register; and at least one base station communicating with the mobile switching center, the method comprising:

a mobile station transmitting a first message to a base station indicating a change of profile request, said first message specifying the number of a new feature list;

the base station communicating receipt of the first message to a mobile switching center;

the mobile switching center transmitting the change of profile request in the form of a second message to the home location register;

the home location register updating the active profile number field with the number of the new feature list; and the home location register transmitting a third message including the new feature list specified in the active profile number field to the mobile switching center.

10. A method according to claim 9, the method further comprising:

the home location register transmitting a fourth message acknowledging the change of profile request received in the second message to the mobile switching center;

the mobile switching center transmitting a fifth message acknowledging receipt of the third message to the home location register.

11. A method according to claim 10 in which the bank of information in the home location register includes a personal identification number field, the method further comprising:

the mobile station transmitting a personal identification number when it transmits the first message to the base station;

the mobile switching center transmitting the personal identification number with the second message to the home location register; and the home location register determining whether the personal identification number is contained in its personal identification number field and transmitting the third message only if the personal identification number is present.

12. A method according to claim 10, wherein the second, third, fourth and fifth messages are respectively "FEATREQ", "QUALDIR", "featreq" and "qualdir" messages in accordance with the IS-41 protocol.

13. A method according to claim 9, wherein every mobile switching center is associated with a respective visitor location register having a bank of entries corresponding respectively to subscribers registered at the respective mobile switching center, the method further comprising:

the mobile switching center updating its visitor location register with the feature list specified in the active profile number field on receipt of the third message.

14. A method according to claim 13 in which the bank of information in the home location register includes a personal identification number field, the method further comprising:

the mobile station transmitting a personal identification number when it transmits the first message to the base station;

the mobile switching center transmitting the personal identification number with the second message to the home location register; and the home location register determining whether the personal identification number is contained in its personal identification number field and transmitting the third message only if the personal identification number is present.

15. A method according to claim 9 in which the bank of information in the home location register includes a personal identification number field, the method further comprising:

the mobile station transmitting a personal identification number when it transmits the first message to the base station;

the mobile switching center transmitting the personal identification number with the second message to the home location register; and the home location register determining whether the personal identification number is contained in its personal identification number field and transmitting the third message only if the personal identification number is present.

16. A method according to claim 9 further comprising:

the first message comprising a profile service number and a new feature list number;

the mobile switching center transmitting the second message only if the profile service number matches a predetermined number;

upon receiving the second message, the home location register comparing the new feature list number to the feature list specified in the active profile number field and if the two are different, replacing the feature list in the active profile number field with the new feature list number before transmitting the third message.

17. A method according to claim 9, wherein the second, third and fourth messages are respectively "FEATREQ", "QUALDIR" and "featreq" messages in accordance with the IS-41 protocol.

* * * * *